(12) United States Patent
Morioka et al.

(10) Patent No.: US 10,697,165 B2
(45) Date of Patent: Jun. 30, 2020

(54) REMOTE CONTROL DEVICE

(71) Applicant: TOTO LTD., Kitakyushu-shi, Fukuoka (JP)

(72) Inventors: Satoko Morioka, Kitakyushu (JP); Masami Yamanaka, Kitakyushu (JP); Masami Tsujita, Kitakyushu (JP)

(73) Assignee: TOTO LTD., Kitakyushu-shi, Fukuoka (JP)

( * ) Notice: Subject to any disclaimer, the term of this patent is extended or adjusted under 35 U.S.C. 154(b) by 0 days.

(21) Appl. No.: 16/163,741

(22) Filed: Oct. 18, 2018

(65) Prior Publication Data
US 2019/0169827 A1    Jun. 6, 2019

(30) Foreign Application Priority Data
Dec. 6, 2017   (JP) .................................. 2017-234087

(51) Int. Cl.
*E03D 9/08*    (2006.01)
*E03D 5/10*    (2006.01)
*G06F 1/3206*  (2019.01)

(52) U.S. Cl.
CPC ............... *E03D 9/08* (2013.01); *E03D 5/10* (2013.01); *E03D 5/105* (2013.01); *G06F 1/3206* (2013.01)

(58) Field of Classification Search
CPC .. E03D 9/08; E03D 5/105; E03D 5/10; G06F 1/3206
See application file for complete search history.

(56) References Cited

U.S. PATENT DOCUMENTS

| 2001/0027102 A1 | 10/2001 | Okazaki et al. |
| 2005/0164690 A1 | 7/2005 | Okazaki et al. |
| 2005/0170821 A1 | 8/2005 | Okazaki et al. |

(Continued)

FOREIGN PATENT DOCUMENTS

| JP | 2005-003692 A | 1/2005 |
| JP | 2005-344375 A | 12/2005 |

(Continued)

OTHER PUBLICATIONS

English translation for JP2017-020284 dated Jan. 26, 2017 in the name of Toto Ltd.

(Continued)

*Primary Examiner* — Aneeta Yodichkas
(74) *Attorney, Agent, or Firm* — Pearne & Gordon LLP

(57) ABSTRACT

A remote control device according to an embodiment includes an operation button, a generator, an electrical storage part, electronic paper, and a controller. The operation button is for remotely operating a wet-area device. The generator generates electrical power by utilizing energy when the operation button is pressed. The electrical storage part stores the electrical power. The electronic paper displays a setting state of the wet-area device. The controller controls a refresh and a display-switching of the electronic paper by utilizing the electrical power stored in the electrical storage part. The controller starts the refresh in a first state by performing a first determination determining whether or not the electrical power stored in the electrical storage part is in the first state. The electrical power stored in the electrical storage part in the first state is larger than electrical power necessary to complete the refresh.

6 Claims, 8 Drawing Sheets

(56) References Cited

U.S. PATENT DOCUMENTS

| | | | |
|---|---|---|---|
| 2005/0170822 A1 | 8/2005 | Okazaki et al. | |
| 2005/0170823 A1 | 8/2005 | Okazaki et al. | |
| 2010/0245341 A1 | 9/2010 | Tanaka | |
| 2014/0289951 A1* | 10/2014 | Morioka | E03D 9/08 4/447 |
| 2017/0244171 A1 | 8/2017 | Lee | |

FOREIGN PATENT DOCUMENTS

| | | |
|---|---|---|
| JP | 2007-158831 A | 6/2007 |
| JP | 2009-71856 A | 4/2009 |
| JP | 2010-237264 A | 10/2010 |
| JP | 2011-022900 A | 2/2011 |
| JP | 5652490 B2 | 11/2014 |
| JP | 2016-204836 A | 12/2016 |
| JP | 2017-20284 A | 1/2017 |
| KR | 10-1023286 B1 | 3/2011 |
| WO | 2016/157965 A1 | 10/2016 |

OTHER PUBLICATIONS

English translation for JP2007-158831 dated Jun. 21, 2007 in the name of Nec Corp.

* cited by examiner

REMOTE CONTROL DEVICE

CROSS-REFERENCE TO RELATED APPLICATIONS

This application is based upon and claims the benefit of priority from Japanese Patent Application No. 2017-234087, filed on Dec. 6, 2017; the entire contents of which are incorporated herein by reference.

FIELD

Embodiments described herein relate generally to a remote control device.

BACKGROUND

There is a remote control device for remotely operating a wet-area device. For example, the remote control device includes multiple operation buttons (switches) and transmits control signals to the wet-area device according to the pressed operation buttons. Japanese Patent No. 5652490 discusses providing, in the interior of a remote control device, a generator that generates electrical power according to the pressing of the operation buttons, and an electrical storage part that stores the generated electrical power. Japanese Publication No. 2017-20284 discusses providing, in a remote control device including a generator and an electrical storage part, a displayer that displays the setting state of the wet-area device.

The inventor has devised the providing of electronic paper for displaying the setting state of a wet-area device in a remote control device including a generator and an electrical storage part. The electronic paper can maintain the display content without consuming electrical power after the information is displayed. Therefore, the power consumption of the remote control device can be reduced by using the electronic paper. It is favorable for the electronic paper to operate (display) by utilizing the electrical power stored in the electrical storage part so that an electrical power supply and the replacement of a battery are unnecessary.

Generally, an operation called refresh is necessary for electronic paper. The refresh is performed to increase the brightness difference of the display of the electronic paper and/or to eliminate afterimages. In the refresh, for example, the colors of all of the display regions of the electronic paper are reversed. Therefore, much electrical power is consumed compared to switching the display content. If the refresh is started in a state in which the electrical power in the electrical storage part is insufficient, the electrical power of the electrical storage part is completely expended partway through the refresh; and the setting state of the wet-area device cannot be displayed appropriately by the electronic paper.

SUMMARY

A remote control device according to an embodiment includes an operation button, a generator, an electrical storage part, electronic paper, and a controller. The operation button is for remotely operating a wet-area device. The generator generates electrical power by utilizing energy when the operation button is pressed. The electrical storage part stores the electrical power. The electronic paper displays a setting state of the wet-area device. The controller controls a refresh and a display-switching of the electronic paper by utilizing the electrical power stored in the electrical storage part. The controller starts the refresh in a first state by performing a first determination determining whether or not the electrical power stored in the electrical storage part is in the first state. The electrical power stored in the electrical storage part in the first state is larger than electrical power necessary to complete the refresh.

DETAILED DESCRIPTION

Figure 1:
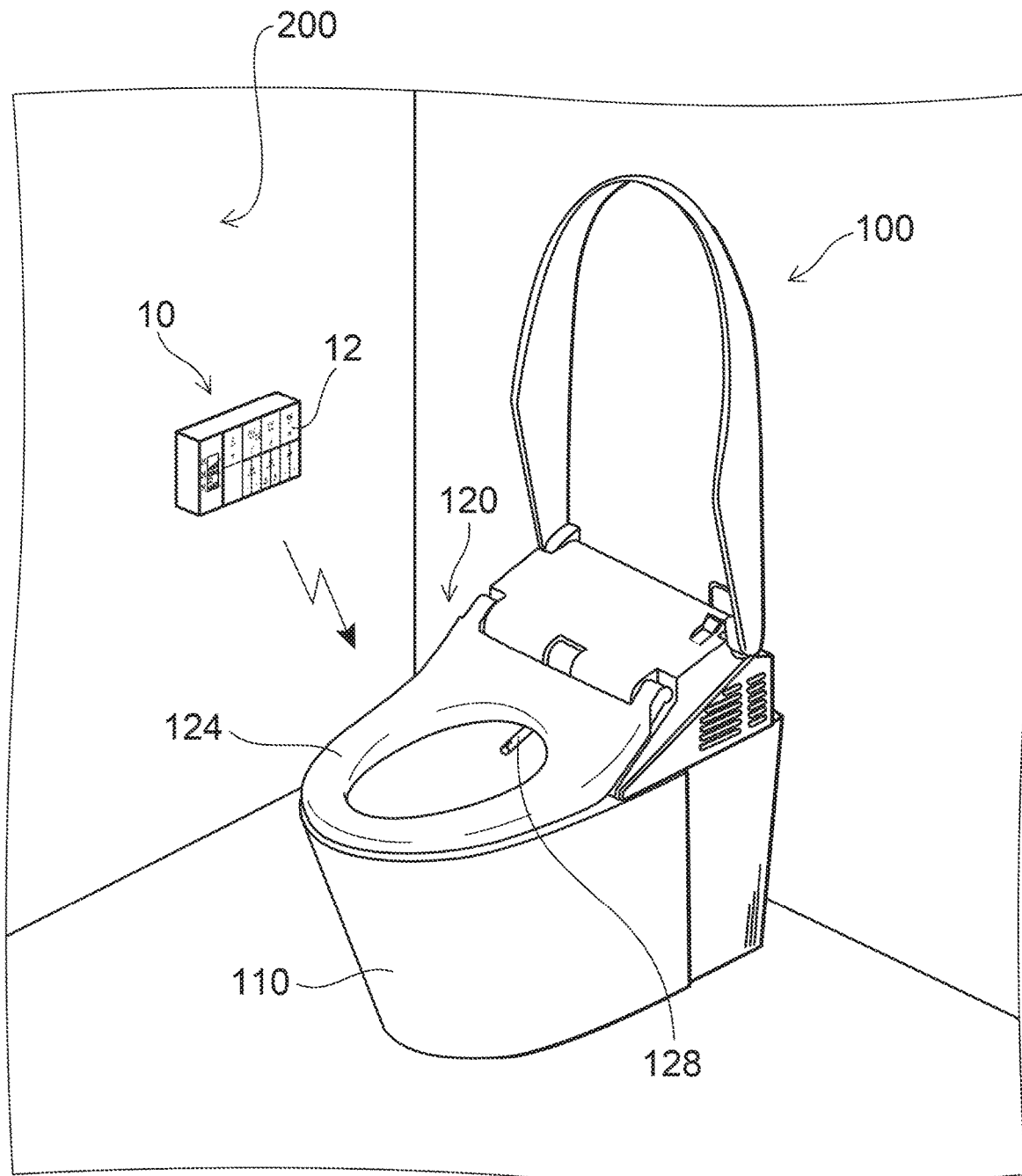
FIG. 1 is a perspective view illustrating a remote control device and a toilet device according to an embodiment.

A first invention is a remote control device including an operation button, a generator, an electrical storage part, electronic paper, and a controller; the operation button is for remotely operating a wet-area device; the generator generates electrical power by utilizing energy when the operation button is pressed; the electrical storage part stores the electrical power; the electronic paper displays a setting state of the wet-area device; the controller controls a refresh and a display-switching of the electronic paper by utilizing the electrical power stored in the electrical storage part; the controller starts the refresh in a first state by performing a first determination determining whether or not the electrical power stored in the electrical storage part is in the first state; and the electrical power stored in the electrical storage part in the first state is larger than electrical power necessary to complete the refresh.

According to the remote control device, the refresh of the electronic paper is started in the first state in which the electrical power stored in the electrical storage part is larger than the electrical power necessary to complete the refresh. Therefore, the refresh of the electronic paper can be completed correctly. Thereby, the stopping of the display of the electronic paper partway through the refresh can be avoided; and the setting information of the wet-area device can be displayed appropriately by the electronic paper. In other words, according to the remote control device, it is possible to correctly perform the refresh of the electronic paper at the appropriate timing by utilizing the electrical power stored in the electrical storage part.

A second invention is the remote control device of the first invention, wherein when the operation button is pressed, the controller transmits a signal for remotely operating the wet-area device by utilizing the electrical power stored in the electrical storage part; and the controller performs the first determination after transmitting the signal.

According to the remote control device, the signal transmission being impossible because the electrical power stored in the electrical storage part was reduced by the refresh can be avoided. In other words, according to the remote control device, the refresh can be performed at the appropriate timing by utilizing the electrical power stored in the electrical storage part while performing the signal transmission more reliably.

A third invention is the remote control device of the first or second invention, wherein the controller performs the first determination according to a pressing operation of the operation button.

According to the remote control device, the first determination is performed easily in a state in which the electrical power stored in the electrical storage part is larger. As a result, the frequency of performing the refresh can be increased; and the display of the electronic paper can be easier to view.

A fourth invention is the remote control device of the third invention, wherein the operation button is for modifying the setting state; and when the operation button is pressed, the controller performs a second determination of determining whether or not the setting state will be modified and performs the first determination in the case where the setting state will not be modified.

According to the remote control device, the first determination is performed in the case where the setting state will not be modified regardless of whether the operation button for modifying the setting state of the wet-area device is pressed. As a result, the performing of the refresh can notify the user that the pressing operation is ineffective. In other words, according to the remote control device, the refresh can be utilized as a notification to the user while performing the refresh at a more appropriate timing.

A fifth invention is the remote control device of the third invention, wherein the operation button is not for modifying the setting state.

The display-switching of the electronic paper is not performed when an operation button that does not modify the setting state is pressed. Accordingly, compared to when an operation button that modifies the setting state is pressed, the likelihood is high that the user is not viewing the screen displayed by the electronic paper. Accordingly, according to the remote control device, the refresh is performed easily in the state in which the user is not viewing the electronic paper. As a result, the likelihood of the user mistaking the refresh to be a misoperation or a malfunction of the electronic paper can be reduced.

A sixth invention is the remote control device of the second invention, wherein the controller performs the first determination after transmitting the signal and performing the display-switching.

According to the remote control device, the refresh can be performed at the appropriate timing by utilizing the electrical power stored in the electrical storage part while more reliably performing the signal transmission and the display-switching.

A seventh invention is the remote control device of the first invention including multiple operation buttons; a portion of the multiple operation buttons is not for modifying the setting state; and the controller performs the first determination when one of the multiple operation buttons is pressed after the portion of the multiple operation buttons is pressed.

According to the remote control device, the refresh can be performed at a more appropriate timing.

An eighth invention is the remote control device of any one of the first to seventh inventions, wherein the wet-area device is a sanitary washing device including a nozzle discharging water toward a human private part.

According to the remote control device, the refresh can be performed at a more appropriate timing while remotely operating the sanitary washing device.

Embodiments of the invention will now be described with reference to the drawings. Similar components in the drawings are marked with the same reference numerals; and a detailed description is omitted as appropriate.

FIG. 1 is a perspective view illustrating a remote control device and a toilet device according to an embodiment.

As illustrated in FIG. 1, the remote control device 10 according to the embodiment is mounted to, for example, a wall surface 200 of a toilet room where the toilet device 100 is provided.

The toilet device 100 includes a western-style sit-down toilet (hereinbelow, called simply the "toilet") 110, and a sanitary washing device 120 provided on the toilet 110. In the example illustrated in FIG. 1, the remote control device 10 is for remotely operating the sanitary washing device 120 of the toilet device 100.

For example, the sanitary washing device 120 has a sanitary washing function, a private part drying function, and a toilet seat heating function. The sanitary washing function is a function of performing a washing operation in which a nozzle 128 is used to wash the "bottom" or the like of a human body (a user) seated on a toilet seat 124. The private part drying function is a function of performing a drying operation of drying the "bottom" or the like of the user seated on the toilet seat 124 by blowing warm air onto the "bottom" or the like wetted by the sanitary washing. The toilet seat heating function is a function of performing a toilet seat heating operation of warming the seating surface of the toilet seat 124 to a suitable temperature.

For example, the sanitary washing device 120 executes one operation of the sanitary washing function, the private part drying function, or the toilet seat heating function based on a wireless signal transmitted from the remote control device 10. The setting states of these operations of the sanitary washing device 120 can be modified by the user by using the remote control device 10. For example, the user can modify the setting states of the force of the washing water squirted in the sanitary washing, the washing position (the position of the nozzle 128), the temperature of the seating surface, etc.

The remote control device 10 includes operation buttons 12 for remotely operating the sanitary washing device 120. The remote control device 10 detects the operations of the operation buttons 12 and transmits wireless signals to the sanitary washing device 120 based on the operated operation buttons 12. The sanitary washing device 120 receives the wireless signals and performs operations corresponding to the wireless signals. Or, the sanitary washing device 120 modifies the setting states corresponding to the wireless signals.

Figure 2:
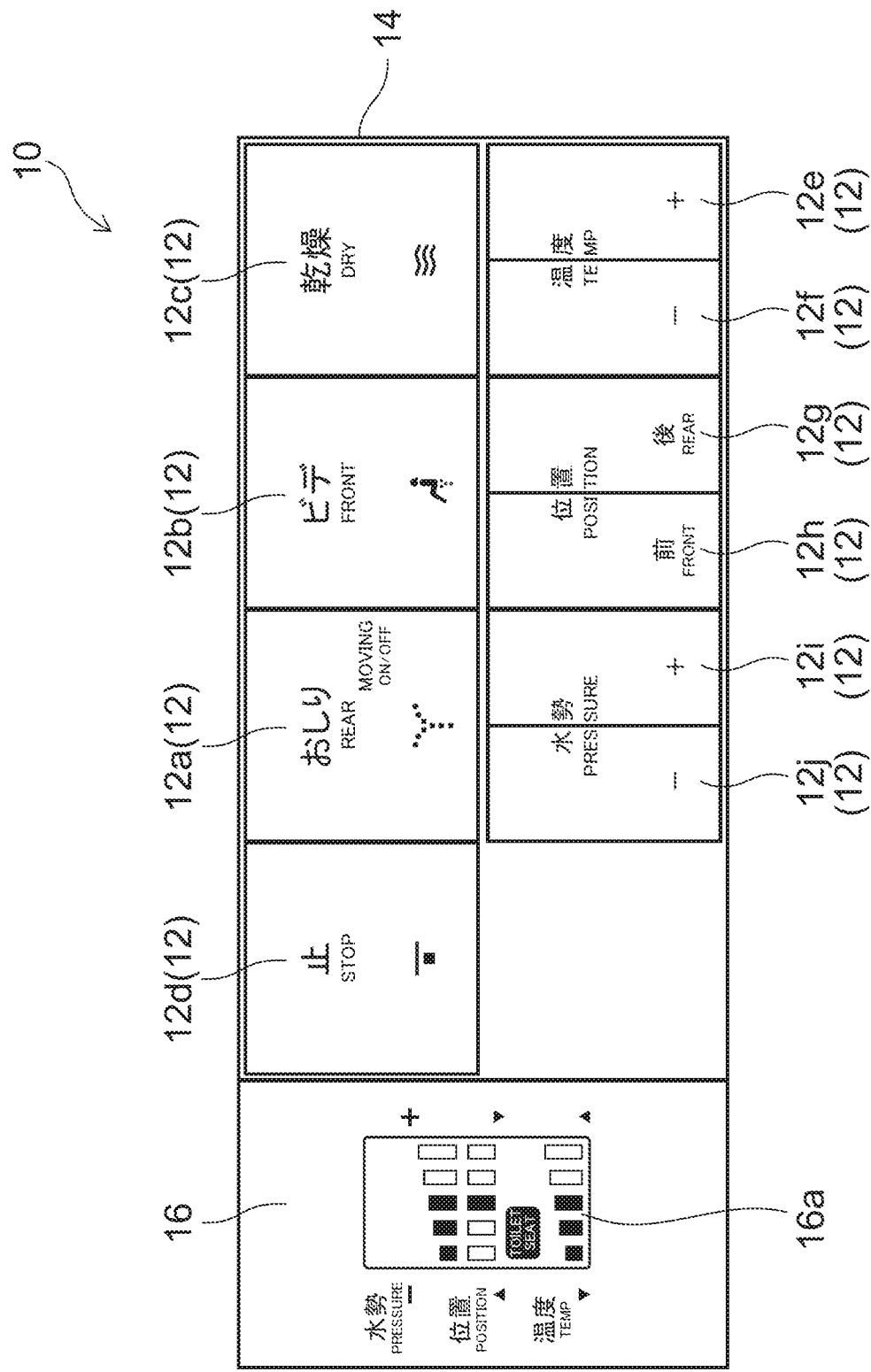
FIG. 2 is a front view illustrating the remote control device according to the embodiment.

FIG. 2 is a front view illustrating the remote control device according to the embodiment.

As illustrated in FIG. 2, the remote control device 10 includes the multiple operation buttons 12, a remote control main body 14 (a housing) supporting the operation buttons 12, and electronic paper 16.

The multiple operation buttons 12 include, for example, operation buttons 12a to 12j. In the example illustrated in FIG. 2, the operation buttons 12a to 12d are buttons for operating the sanitary washing device 120. The operation buttons 12e to 12j are buttons for modifying the setting state of the sanitary washing device 120.

The operation button 12a is a button for instructing the start of the bottom wash. The operation button 12b is a button for instructing the start of the bidet wash. The operation button 12c is a button for instructing the start of the private part drying. The operation button 12d is a button for instructing the stop of the sanitary washing function.

The operation button 12e is a button for increasing the temperature of the seating surface; and the operation button 12f is a button for reducing the temperature. The operation button 12g is a button for moving the position of the nozzle 128 rearward; and the operation button 12h is a button for moving the position frontward. The operation button 12i is a button for strengthening the water force; and the operation button 12j is a button for weakening the water force.

For example, the operation button 12 is a so-called push-button in which a pressing operation (a pushing operation) is possible. The operation button 12 is movable between a regular position and a lowermost position and moves from the regular position to the lowermost position according to the pressing operation. In the non-operated state, the operation button 12 is maintained at the regular position by a not-illustrated spring, etc. The operation button 12 is moved to the lowermost position by the pressing operation; subsequently, the operation button 12 is returned to the regular position by the release of the pressing operation.

For example, the electronic paper 16 is provided to be adjacent to the remote control main body 14. The electronic paper 16 may be provided as one body with the remote control main body 14. For example, the electronic paper 16 may be an electrophoretic-type or an electronic liquid powder-type. The electronic paper 16 includes a display region 16a displaying the setting state of the sanitary washing device 120. In the example illustrated in FIG. 2, the setting states of the water force, the position of the nozzle 128, and the temperature of the seating surface are displayed in the display region 16a. The user can modify these setting states of the sanitary washing device 120 by operating the operation buttons 12.

FIGS. 3A to 3G are front views illustrating the electronic paper of the remote control device according to the embodiment.

Figure 3:
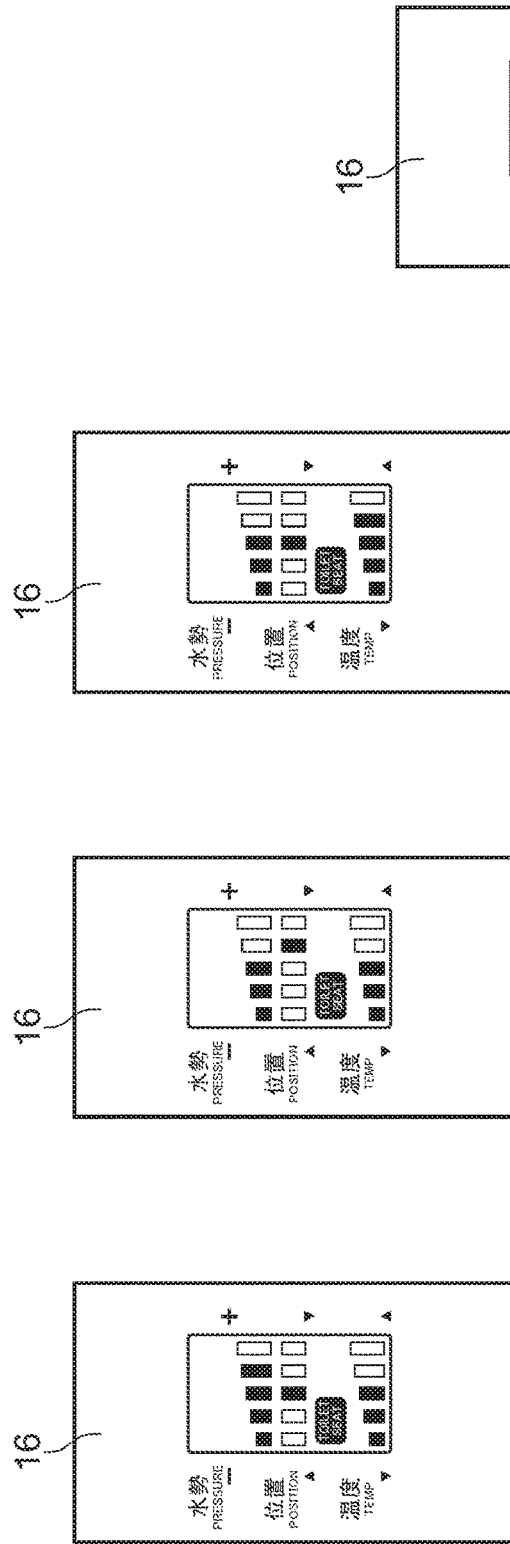
FIGS. 3A to 3G are front views illustrating the electronic paper of the remote control device according to the embodiment.

For example, when the operation button 12e or 12f is pressed in the state illustrated in FIG. 2, the display of the electronic paper 16 is switched to the state illustrated in FIG. 3E or FIG. 3F. When the operation button 12g or 12h is pressed in the state illustrated in FIG. 2, the display of the electronic paper 16 is switched to the state illustrated in FIG. 3C or FIG. 3D. When the operation button 12i or 12j is pressed in the state illustrated in FIG. 2, the display of the electronic paper 16 is switched to the state illustrated in FIG. 3A or FIG. 3B.

Thus, the setting state of the sanitary washing device 120 is displayed by the electronic paper 16. A controller 26 performs the display-switching of the electronic paper 16 according to the operation of the operation button 12 modifying the setting state. The user can confirm the setting state of the sanitary washing device 120 by viewing the electronic paper 16.

Other than the display-switching described above, the refresh of the electronic paper 16 is performed. The refresh is performed to increase the brightness of the regions to be displayed as white and to reduce the brightness of the regions to be displayed as black.

In the refresh, for example, the display of the electronic paper 16 is switched from the state illustrated in FIG. 2 to the state illustrated in FIG. 3G. In other words, the regions that are displayed as white are reversed to black; and the regions that are displayed as black are reversed to white. Subsequently, the state is switched from the state illustrated in FIG. 3G to the state illustrated in FIG. 2.

Or, the display of the electronic paper 16 may be switched from the state illustrated in FIG. 2 so that all of the regions are one of black or white; continuing, all of the regions may be switched to the other of black or white; subsequently, the state may be switched to the state illustrated in FIG. 2. The specific method of the refresh is modifiable as appropriate.

Figure 4:
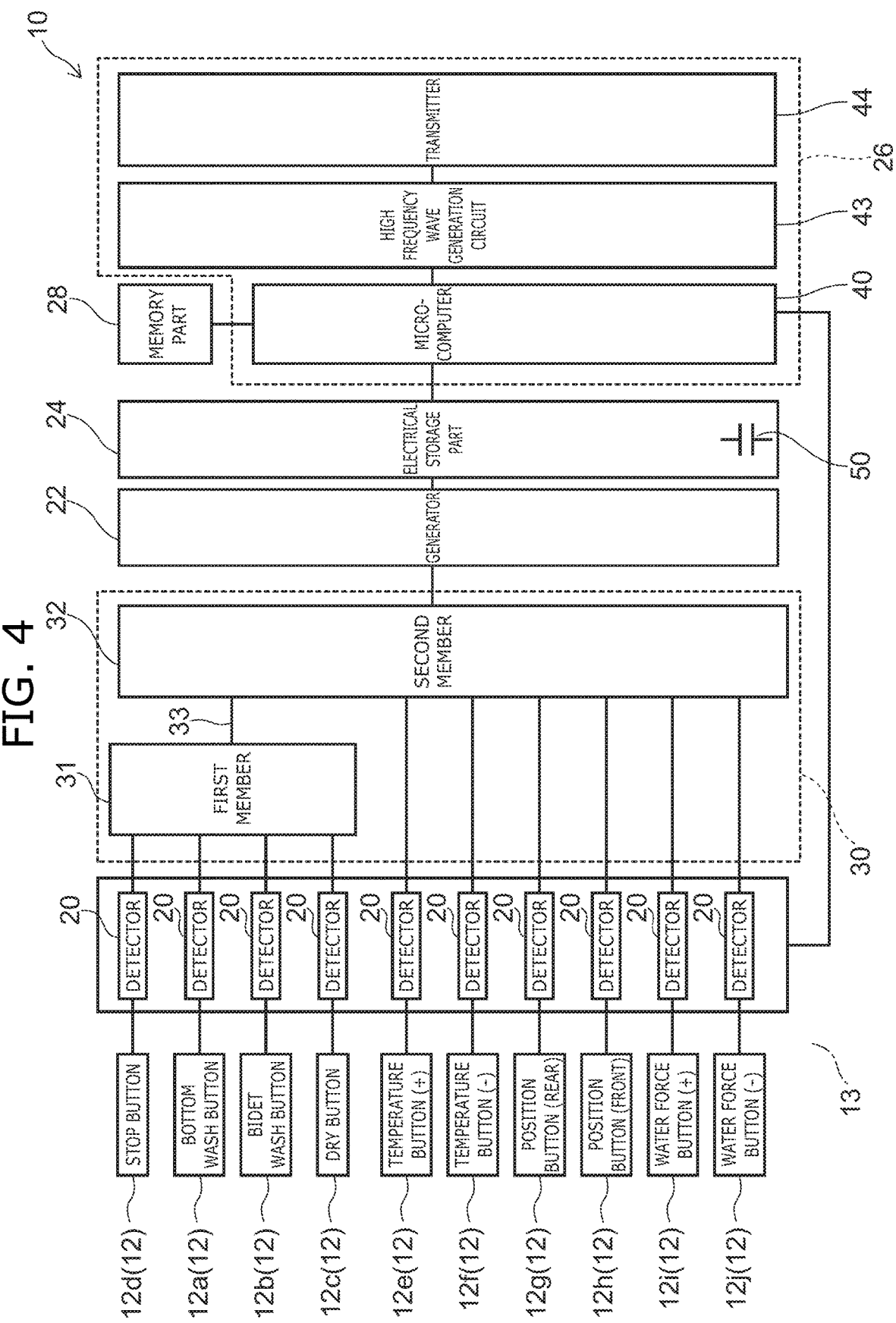
FIG. 4 is a block diagram illustrating the configuration of the remote control device according to the embodiment.

FIG. 4 is a block diagram illustrating the configuration of the remote control device according to the embodiment.

As illustrated in FIG. 4, the remote control device 10 further includes multiple detectors 20, a generator 22, an electrical storage part 24, the controller 26, a memory part 28, and a transmission part 30. For example, the multiple detectors 20, the generator 22, the electrical storage part 24, the controller 26, the memory part 28, and the transmission part 30 are contained in the interior of the remote control main body 14.

The multiple detectors 20 are provided to correspond respectively to the multiple operation buttons 12. The multiple detectors 20 respectively detect the pressing operations of the multiple operation buttons 12. Each of the detectors 20 includes, for example, a Hall element. Each of the detectors 20 may be, for example, a mechanical switch, etc.

The generator 22 generates electrical power by utilizing the energy when one of the multiple operation buttons 12 is pressed. For example, a motor is provided in the generator 22. The generator 22 transfers the operating force due to the pressing operation of the operation button 12 to the rotation shaft of the motor and causes the rotation shaft to rotate. Thereby, the generator 22 generates alternating current electrical power from the motor. The power generation method of the generator 22 is not limited to a motor and may be any method that can supply the necessary electrical power. The electrical power that is output from the generator 22 may be a direct current or a pulsating current.

The transmission part 30 transfers the operating force to the generator 22. The transmission part 30 includes a first member 31 and a second member 32.

The first member 31 is provided to correspond to the operation buttons 12a to 12d. The first member 31 receives the operating force due to the pressing operations of the operation buttons 12a to 12d and transfers the operating force to the second member 32 via a link member 33. The second member 32 receives the operating force from the first member 31 and transfers the operating force to the generator 22. The second member 32 is provided to correspond to the operation buttons 12e to 12j. The second member 32 receives the operating force due to the pressing operations of the operation buttons 12e to 12j and transfers the operating force to the generator 22.

The controller 26 is electrically connected to each of the multiple detectors 20. The controller 26 discriminates the operated operation buttons 12 based on the detection results of the multiple detectors 20. Then, the controller 26 remotely operates the sanitary washing device 120 by transmitting a wireless signal corresponding to the discriminated operation button 12 to the sanitary washing device 120.

The controller 26 includes, for example, a microcomputer 40, a high frequency wave generation circuit 43, and a transmitter 44. The microcomputer 40 discriminates the operated operation button 12 and generates a signal to remotely operate the sanitary washing device 120 based on the discriminated operation button 12. The high frequency wave generation circuit 43 converts the signal generated by the microcomputer 40 into a high frequency signal. The frequency of the high frequency signal is, for example, 2.4 GHz. The transmitter 44 includes an antenna, converts the high frequency signal generated by the high frequency wave generation circuit 43 into a wireless signal, and transmits the wireless signal to the sanitary washing device 120.

The microcomputer 40, the high frequency wave generation circuit 43, and the transmitter 44 may be contained inside one chip or may be separated into different elements. The communication method between the remote control device 10 and the sanitary washing device 120 is not limited to the description recited above and may be arbitrary. The configuration of the controller 26 is not limited to the description recited above and may be any configuration that can discriminate the operation button 12, perform wireless communication with the sanitary washing device 120, etc.

The electrical storage part 24 includes an electrical storage element 50 storing the electrical power generated by the generator 22. When the voltage of the electrical storage element 50 becomes at least the voltage necessary to startup the controller 26, the controller 26 that is electrically connected to the electrical storage element 50 is started up by the electrical power stored in the electrical storage element 50. The electrical storage element 50 includes, for example, a capacitor, a storage battery, etc. Further, when the voltage of the electrical storage element 50 becomes a prescribed value or more, the controller 26 performs various operations by utilizing the electrical power stored in the electrical storage element 50.

Here, "when the voltage of the electrical storage element 50 becomes the prescribed value or more" is, for example, when the electrical power necessary to startup the controller 26 and transmit the wireless signal is stored in the electrical storage element 50. In the case where the controller 26 multiply transmits the wireless signals, "when the voltage of the electrical storage element 50 becomes the prescribed value or more" is when the electrical power necessary to startup the controller 26 and multiply transmit the wireless signals is stored in the electrical storage element 50. Thus, the prescribed value of the voltage of the electrical storage element 50 is set according to the power consumption of the controller 26. The prescribed value is, for example, 3.0 V.

For example, the controller 26 transitions to a sleep state when not operated for a prescribed amount of time. As the controller 26 is operated and as time elapses, the controller 26 stops when the electrical power (the electrical power amount) stored in the electrical storage element 50 falls below the electrical power necessary to operate the controller 26.

The memory part 28 stores the setting state of the sanitary washing device 120. When the operation button 12 is pressed, for example, the controller 26 refers to the setting state stored in the memory part 28 and transmits a signal toward the sanitary washing device 120 to reflect the modification of the setting state.

More specifically, the operation buttons 12 that are pressed and the order of the pressing are stored in the memory part 28. Or, the number of times modifications of the setting states are performed is stored in the memory part 28. The controller 26 causes the electronic paper 16 to display the setting states after the modifications by the operation buttons 12 of the setting states based on the information stored in the memory part 28.

The controller 26 stores the setting states after the modifications in the memory part 28. For example, the memory part 28 retains the stored setting states even while the microcomputer 40 is stopped. Or, the setting states that are stored in the memory part 28 may return to the initial setting when the electrical storage amount decreases and the operation of the microcomputer 40 stops.

Figure 5:
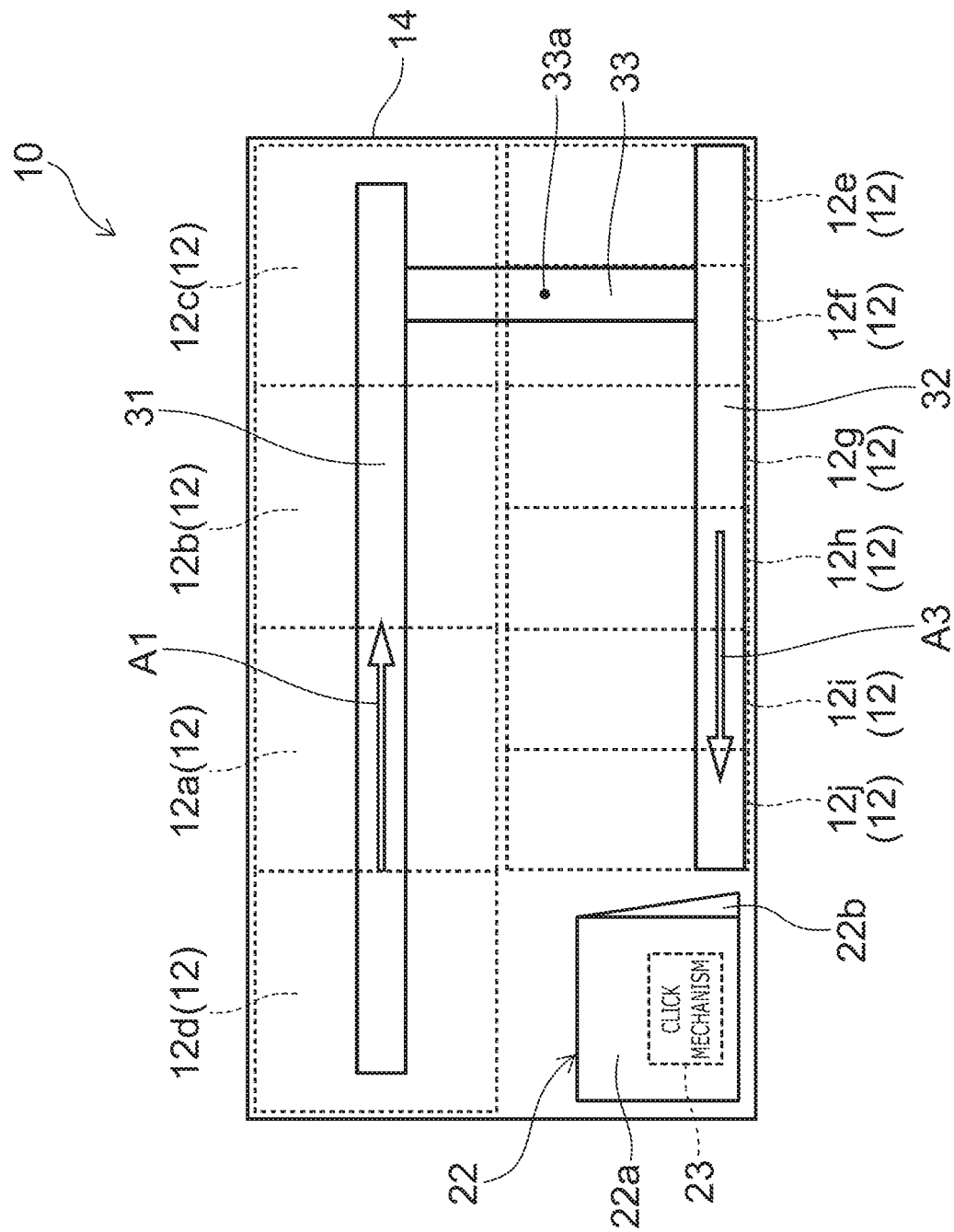
FIG. 5 is a front view illustrating the internal structure of the remote control device according to the embodiment.

FIG. 5 is a front view illustrating the internal structure of the remote control device according to the embodiment.

As illustrated in FIG. 5, the generator 22 includes a main body module 22a and a movable part 22b. The movable part 22b moves between a protruded position protruding from the main body module 22a, and a pressed position pressed inside the main body module 22a. In the non-operated state, the movable part 22b is maintained at the protruded position by a not-illustrated spring, etc. When the movable part 22b is moved from the protruded position to the pressed position, electrical power is generated by the movement.

The first member 31 and the second member 32 are, for example, members having rod configurations. The first member 31 is provided to oppose the operation buttons 12a to 12d; and the second member 32 is provided to oppose the operation buttons 12e to 12j. Further, the second member 32 is provided to oppose the movable part 22b of the generator 22 in the longitudinal direction.

The first member 31 and the second member 32 are mounted to be slidable respectively in directions illustrated by arrow A1 and arrow A3. The first member 31 and the second member 32 are linked to each other by the link member 33. The link member 33 is fixed to the remote control main body 14 by a rotation shaft 33a. Thereby, when the first member 31 slides in one direction, the second member 32 conjunctively slides in the reverse direction.

When the pressing operation of one of the operation buttons 12a to 12d is performed, the operating force is transferred to the first member 31; and the first member 31 slides. When the first member 31 slides, the second member 32 slides due to the link member 33. Or, when the pressing operation of one of the operation buttons 12e to 12j is performed, the operating force is transferred to the second member 32; and the second member 32 slides. When the second member 32 slides, the second member 32 contacts the movable part 22b and causes the movable part 22b to move from the protruded position to the pressed position. Thus, power generation is performed by the generator 22 due to the pressing operation of each of the operation buttons 12.

The remote control device 10 further includes a click mechanism 23. Due to the click mechanism 23, the pressing operation of the operation button 12 provides the user with a click sensation. Due to the click sensation, the user knows that the pressing operation of the operation button 12 was accepted.

In the example, the click mechanism 23 is provided in the generator 22. In the generator 22, for example, when the movable part 22b is pressed against an elastic force of a spring, etc., an interlocking member that engages the movable part 22b moves. Then, when the movable part 22b moves to the pressed position, the engaged state between the interlocking member and the movable part 22b is temporarily released by the click mechanism 23; and the interlocking member is returned to the initial position by the elastic force. At this time, the operating force of the operation button 12 weakens and is communicated to the user as the click sensation.

The interlocking member of the click mechanism 23 is linked to the rotation shaft of the motor via a gear, etc.; and the rotation shaft rotates and power generation is performed by the force when the interlocking member returns to the initial position. In the generator 22, the power generation is performed by the movable part 22b being moved to the pressed position. Then, the click sensation is provided to the operated operation button 12 when the generator 22 generates power.

In this configuration, for example, the power generation amount can be controlled by the elastic force applied to the interlocking member and is independent of the speed of the pressing operation of the user, etc. Thereby, for example, the fluctuation of the power generation amount between operations can be suppressed. A stable power generation amount can be obtained in the generator 22.

In the example, the click mechanism 23 also is a portion of the power generation mechanism of the generator 22. It is not always necessary to provide the click mechanism 23 in the generator 22; and the click mechanism 23 may be provided separately from the generator 22.

FIG. 6A to FIG. 6D are schematic views illustrating a portion of the remote control device according to the embodiment. FIG. 6A to FIG. 6D schematically illustrate an example of the pressing operation of the operation button 12.

Figure 6A:
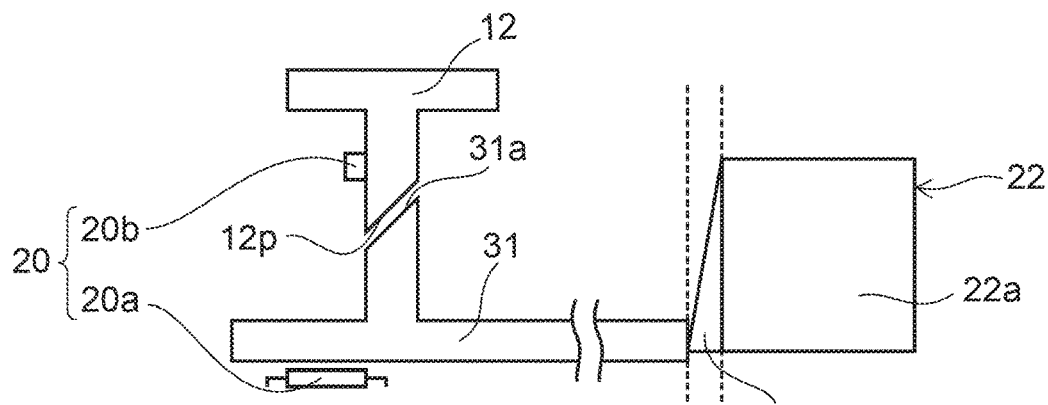
FIG. 6A to FIG. 6D are schematic views illustrating a portion of the remote control device according to the embodiment.
Figure 6B:
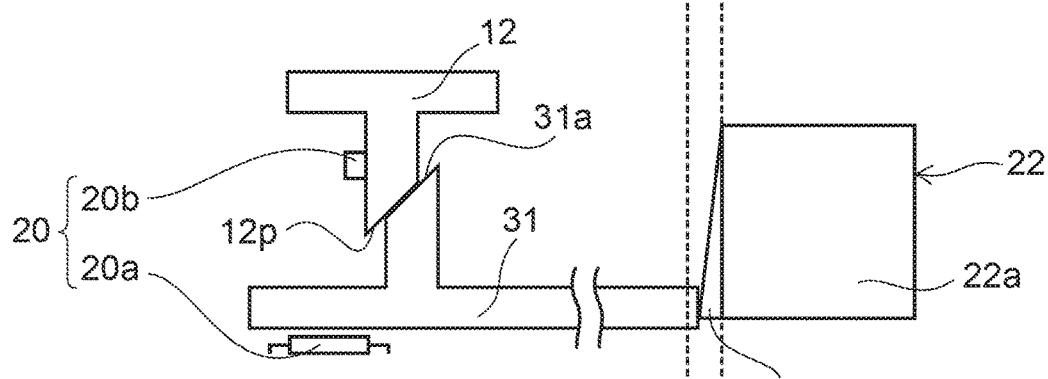
Figure 6C:
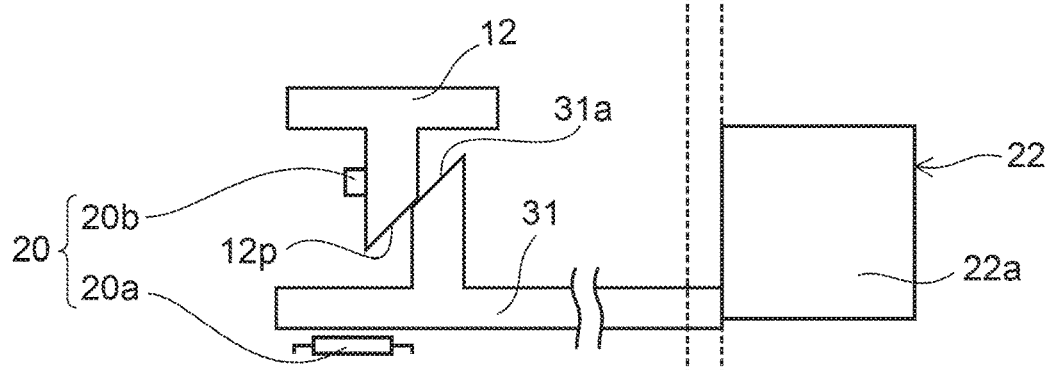
Figure 6D:
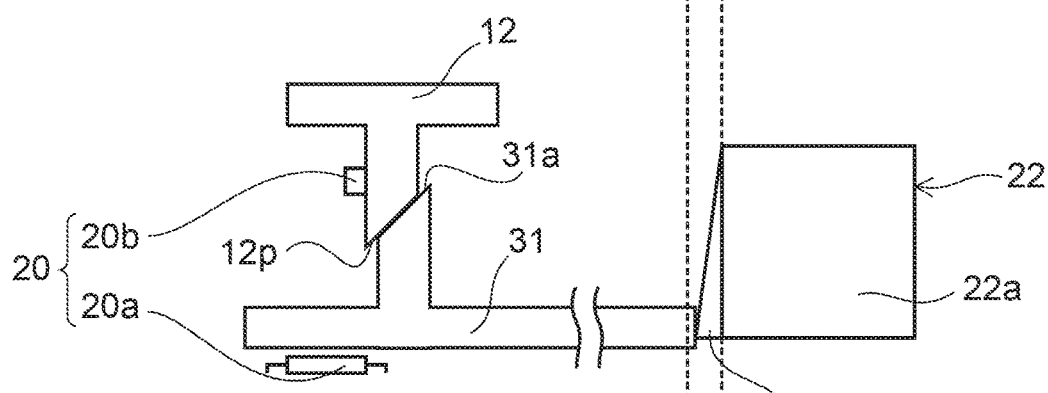

FIG. 6A illustrates the state in which the operation button 12 is at the regular position. FIG. 6B illustrates the position of the operation button 12 where the detector 20 detects the pressing operation. FIG. 6C illustrates the state in which the operation button 12 is at the lowermost position. FIG. 6D illustrates the position of the operation button 12 where the detection state of the pressing operation by the detector 20 is released.

As illustrated in FIG. 6A, the detector 20 includes, for example, a Hall element 20a and a magnet 20b. For example, the Hall element 20a is maintained at a prescribed position inside the remote control main body 14. The magnet 20b is mounted to the operation button 12.

When the operation button 12 is pressed as illustrated in FIG. 6B, the distance between the Hall element 20a and the magnet 20b shortens. Thereby, the pressing operation of the operation button 12 is detected by the detector 20. Thus, for example, the detector 20 detects the pressing operation of the operation button 12 without contact. The position of the Hall element 20a and the position of the magnet 20b may be the reverse of those recited above. In other words, the Hall element 20a may be provided at the operation button 12; and the magnet 20b may be provided inside the remote control main body 14. The method for detecting the pressing operation is not limited thereto and may be any method.

A slide cam 31a that has a tilted surface configuration is provided in the first member 31. A tilted surface 12p that corresponds to the slide cam 31a is provided in the operation button 12 at a position opposing the slide cam 31a. Thereby, when the pressing operation of the operation button 12 is performed, the force in the perpendicular direction due to the tilt of the slide cam 31a is converted into a force in the horizontal direction; and the first member 31 slides. Although not illustrated, similarly to the first member 31, the second member 32 also slides due to a slide cam.

As the operation button 12 is pressed further as illustrated in FIG. 6C, the operation button 12 moves to the lowermost position. Thereby, the movable part 22b of the generator 22 moves to the pressed position; and the power generation is performed by the generator 22.

When the operation button 12 moves to the power generation position which is on the lowermost position side of the detection position of the detector 20 (the position illustrated in FIG. 6B), the generator 22 causes the voltage of the electrical storage element 50 to become a prescribed value or more. Thereby, the transmission of the signal from the controller 26, etc., are made possible by the generator 22 using only the pressing operation.

In the example, the lowermost position is the power generation position. The power generation position is not limited thereto and may be any position between the detection position and the lowermost position. In other words, the power generation position is the lowermost position or a position between the detection position and the lowermost position. In the example, the power generation is performed by the generator 22 when the movable part 22b moves to the pressed position. The position of the movable part 22b where the power generation is performed is not limited to the pressed position and may be any position between the protruded position and the pressed position.

When the pressing operation of the operation button 12 is released, the movable part 22b of the generator 22 is returned to the protruded position by the elastic force. When the movable part 22b is returned to the protruded position, the elastic force is transferred to the operation button 12 via a transmission mechanism; and the operation button 12 is returned to the regular position. The operation button 12 may be returned to the regular position by only the elastic force from an elastic body (a spring, rubber, etc.) provided inside the generator 22 or may be returned to the regular position by further providing a transmission mechanism and/or another elastic body in the operation button 12.

As illustrated in FIG. 6D, the detection state of the pressing operation is released for the multiple detectors 20 between when the pressing operation is released and when the operation button 12 returns to the regular position from the power generation position. At this time, due to the hysteresis property of the Hall element 20a, the detection by the detector 20 is released in a state in which the distance to the magnet 20b is more distal than when detecting. Thereby, for each of the multiple detectors 20, the position of the operation button 12 where the detection state is released is more proximal to the regular position than is the detection position.

By utilizing the electrical power generated by the operation described above and stored in the electrical storage part 24, the controller 26 generates the signal to remotely operate the sanitary washing device 120 and performs the transmission of the signal toward the sanitary washing device 120. The controller 26 performs the display-switching and the refresh of the electronic paper 16 by utilizing the electrical power stored in the electrical storage part 24. For convenience of description hereinbelow, the series of operations of the generation and the transmission of the signals by the controller 26 is called simply the "signal transmission."

For example, the electrical power that is stored in the electrical storage part 24 by one pressing operation of the operation button 12 is larger than the sum of the electrical power necessary for the signal transmission and the electrical power necessary for the display-switching. In such a case, electrical power remains in the electrical storage part 24 even after the signal transmission and the display-switching are performed according to the pressing operation. For example, the controller 26 performs the refresh by utilizing the remaining electrical power.

However, if the refresh is started in a state in which sufficient electrical power does not remain, there is a possibility that the refresh will not be completed correctly. For example, in the case where the electrical power of the electrical storage part 24 is completely expended partway through the refresh, there is a possibility that the switching from the display of FIG. 3G to the normal display cannot be performed; and the setting state of the sanitary washing device 120 cannot be displayed appropriately by the electronic paper 16. Accordingly, it is favorable for the refresh to be started in a state in which sufficient electrical power is stored the electrical storage part 24.

For this problem, a first determination is performed by the controller 26 in the remote control device 10 according to the embodiment. In the first determination, it is determined whether or not the electrical storage amount is in a first state in which the electrical storage amount is larger than the electrical power necessary to complete the refresh. The controller 26 starts the refresh after the first determination in the first state.

For example, in the case where it is determined in the first determination that the electrical storage amount is in the first state, the controller 26 starts the refresh. Or, the controller 26 starts the refresh of the electronic paper 16 after performing a prescribed operation after it is determined in the first determination that the electrical storage amount is in the first state.

The refresh of the electronic paper 16 can be completed correctly by the controller 26 performing the first determination and starting the refresh of the electronic paper 16 in the first state. Therefore, the stopping of the display of the electronic paper 16 partway through the refresh can be avoided; and the setting information of the sanitary washing device 120 can be displayed appropriately by the electronic paper 16. In other words, according to the remote control device 10 according to the embodiment, the refresh of the electronic paper 16 can be performed at the appropriate timing by utilizing the electrical power stored in the electrical storage part 24.

After determining in the first determination that the electrical storage amount is in the first state, the controller 26 may perform another determination and may not perform the refresh of the electronic paper 16 as a result of the other determination. After determining in the first determination that the electrical storage amount is in the first state, the controller 26 may not perform the refresh in the case where the pressing operation of the operation button 12 is detected.

For example, in the other determination, it is determined whether or not the electrical storage amount is lower than a threshold. A value that is larger than the electrical power necessary to complete the refresh is set as the threshold. The controller 26 performs the refresh in the case where the electrical storage amount is lower than the threshold. The controller 26 does not perform the refresh in the case where the electrical storage amount is greater than the threshold.

The electrical storage amount decreases as time elapses. Accordingly, as the electrical storage amount decreases as time elapses, the electrical storage amount eventually will fall below the threshold. For example, the controller 26 is started up at a prescribed interval, detects the electrical storage amount, and performs the refresh in the case where it is detected that the electrical storage amount is lower than the threshold electrical power.

Or, the first determination may be performed after the other determination recited above. For example, the other determination is performed according to the pressing operation of the operation button 12. In the case where it is determined in the other determination that the electrical storage amount is lower than the threshold, the first determination is performed according to the determination result of the other determination.

After the refresh of the electronic paper 16 is performed, if the time until the next refresh is performed is long, the brightness difference (the contrast) between white and black of the display region 16a of the electronic paper 16 decreases. By performing the other determination recited above, the timing of performing the refresh can be postponed. When the timing of performing the following refresh will be later, the decrease of the contrast in the meantime can be suppressed by setting the timing of performing the refresh to be postponed.

Figure 7A:
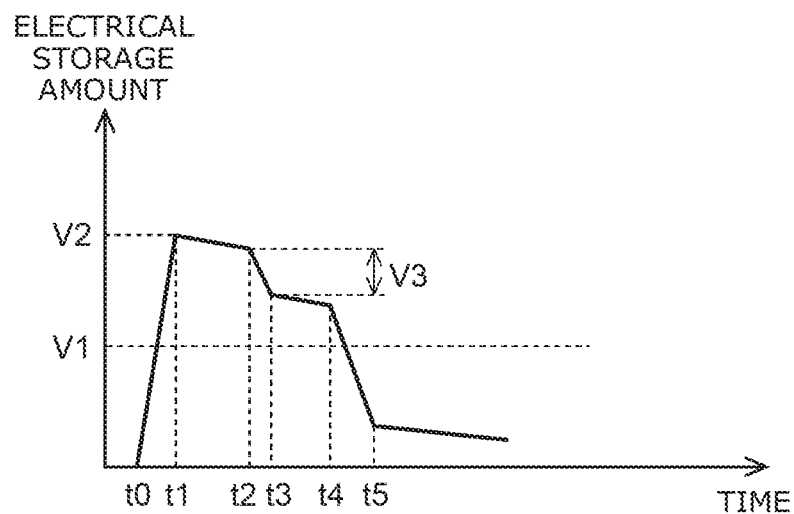
FIGS. 7A and 7B are graphs schematically illustrating the change of the electrical power stored in the electrical storage part.
Figure 7B:
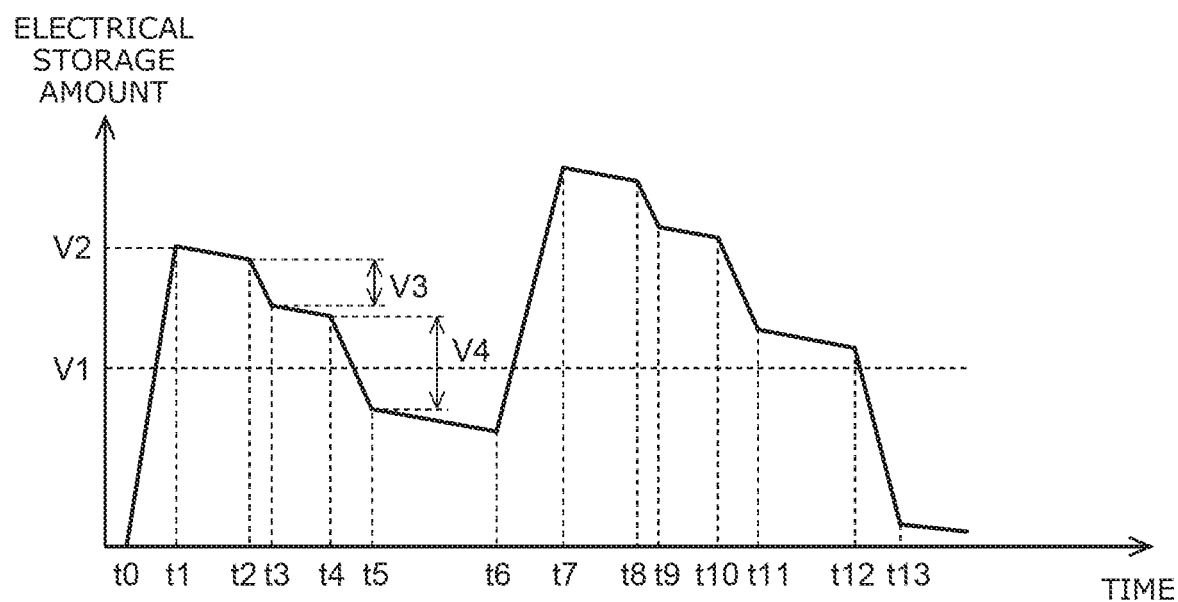

FIGS. 7A and 7B are graphs schematically illustrating the change of the electrical power stored in the electrical storage part.

It is favorable for the controller 26 to perform the first determination recited above after performing the signal transmission. In other words, the timing of performing the refresh is after the signal transmission.

FIG. 7A illustrates the transition of the electrical storage amount for the control method. From time t0 to t1, the operation button 12 is pressed; electrical power is generated by the generator 22; and electrical power V2 is stored in the electrical storage part 24. The microcomputer 40 is started up by the stored electrical power. Continuing, from time t2 to t3, the signal transmission is performed; and electrical power V3 is consumed.

Continuing, from time t3 to t4, the controller 26 (the microcomputer 40) performs the first determination. In the example illustrated in FIG. 7A, the electrical storage amount at time t4 is larger than electrical power V1 necessary to complete the refresh. Therefore, the controller 26 performs the refresh from time t4 to t5. After the refresh, for example, the controller 26 (the microcomputer 40) stops due to the decrease of the electrical storage amount.

By performing the first determination after performing the signal transmission, the signal transmission being impossible because the electrical storage amount decreased due to the refresh can be avoided. In other words, according to the control method, the refresh can be performed at the appropriate timing by utilizing the electrical power stored in the electrical storage part 24 while more reliably performing the signal transmission.

More favorably, the controller 26 performs the first determination after performing the signal transmission and performing the display-switching. In other words, the timing of performing the refresh is after the signal transmission and the display-switching.

FIG. 7B illustrates the transition of the electrical storage amount for the control method. The operations from time t0 to t3 are similar to the example illustrated in FIG. 7A. Subsequently, the controller 26 performs the display-switching from time t4 to t5. Thereby, electrical power V4 is consumed. Then, the controller 26 performs the first determination at time t5. The refresh is not performed because the electrical storage amount at time t5 is smaller than the electrical power V1 necessary to complete the refresh.

Subsequently, the operation button 12 is pressed again at time t6; and electrical power is stored in the electrical storage part 24. The signal transmission and the display-switching are performed by the controller 26 from time t8 to t9 and from time t10 to t11. Then, the controller 26 performs the first determination at time t12. The electrical storage amount at time t12 is larger than the electrical power V1 necessary to complete the refresh. Therefore, the controller 26 performs the refresh from time t12 to t13. For example, the controller 26 (the microcomputer 40) stops due to the decrease of the electrical storage amount after the refresh.

According to the control method, the refresh can be performed at the appropriate timing by utilizing the electrical power stored in the electrical storage part 24 while more reliably performing the signal transmission and the display-switching.

It is favorable for the controller 26 to perform the first determination according to the pressing operation of the operation button 12. For example, the controller 26 performs the signal transmission and the display-switching according to the pressing operation of the operation button 12 and performs the first determination after these operations are completed. The electrical storage amount is largest directly after the operation button 12 is pressed, and decreases as time elapses. Accordingly, the first determination is performed easily in a state in which the electrical storage amount is larger by performing the first determination according to the pressing operation of the operation button 12. As a result, the frequency of performing the refresh can be increased; and the display of the electronic paper 16 can be easier to view.

When the operation button 12 for modifying the setting state of the sanitary washing device 120 is pressed, the controller 26 may perform a second determination of determining whether or not the setting state actually will be modified. For example, the controller 26 performs the first determination in the case where it is determined in the second determination that the setting state will not be modified.

For example, settable ranges are determined for the setting states of each of the water force, the position, and the temperature. The user can modify the setting states of the sanitary washing device 120 within these ranges by using the operation buttons 12. In the state in which these setting states are at the range limits, the setting states are not modified even when further modification is attempted by using the operation buttons 12. In the case where the setting state will not be modified even though the operation button 12 for modifying the setting state of the sanitary washing device 120 was pressed, the controller 26 performs the first determination and as a result performs, for example, the refresh.

As an example, the operation buttons 12g and 12h are for modifying the position where water is discharged from the nozzle 128. In the state in which the discharge position is all the way to the front of the settable range, the discharge position is not modified when the operation button 12h is pressed. At this time, the controller 26 performs the first determination.

Or, there are cases where a non-acceptance interval is set in the controller 26 such that operations by the operation buttons 12 are not accepted after one of the operation buttons 12 is pressed. In other words, even when the operation button for modifying the setting state is pressed in the non-acceptance interval, the setting state is not modified. The non-acceptance interval is set to reliably and more stably perform the signal transmission by the remote control device 10, the acceptance of the signal by the sanitary washing device 120, the modification of the setting state of the sanitary washing device 120, etc. In the case where the operation button 12 for modifying the setting state is pressed in the non-acceptance interval, the controller 26 performs the first determination and as a result performs, for example, the refresh.

As illustrated in FIG. 3G, the display of the electronic paper 16 changes greatly in the refresh. Therefore, by performing the first determination and performing the refresh in the case where the setting state will not be modified even though the operation button 12 was pressed, the user can be notified that the pressing operation is ineffective. In other words, according to the control method, the refresh can be utilized as a notification to the user while performing the refresh at a more appropriate timing.

There are cases where the operation button 12 for modifying the setting state is pressed consecutively multiple times. For example, there are cases where one of the operation buttons 12e to 12j is pressed consecutively two times to greatly modify the setting state from the state illustrated in FIG. 2. In such a case, if the refresh is performed each time the display-switching is performed, the display content changes inordinately; and the appearance is complex. There is also a possibility that the user may mistakenly think that a misoperation or a malfunction of the electronic paper 16 has occurred. From these perspectives as well, as described above, it is favorable for the refresh to be performed in the case where the setting state will not be modified.

The controller 26 may perform the first determination when the operation button 12 that does not modify the setting state is pressed. The display-switching of the electronic paper 16 is not performed when the operation button 12 not modifying the setting state is pressed. Accordingly, compared to when the operation button 12 for modifying the setting state is pressed, the likelihood is high that the user is not viewing the screen displayed by the electronic paper 16. Accordingly, the refresh is performed easily in the state in which the user is not viewing the electronic paper 16. As a result, the likelihood of the user mistakenly thinking that the refresh is a misoperation or a malfunction of the electronic paper 16 can be reduced.

An example of a favorable control method by the controller 26 described above is illustrated in FIG. 8.

Figure 8:
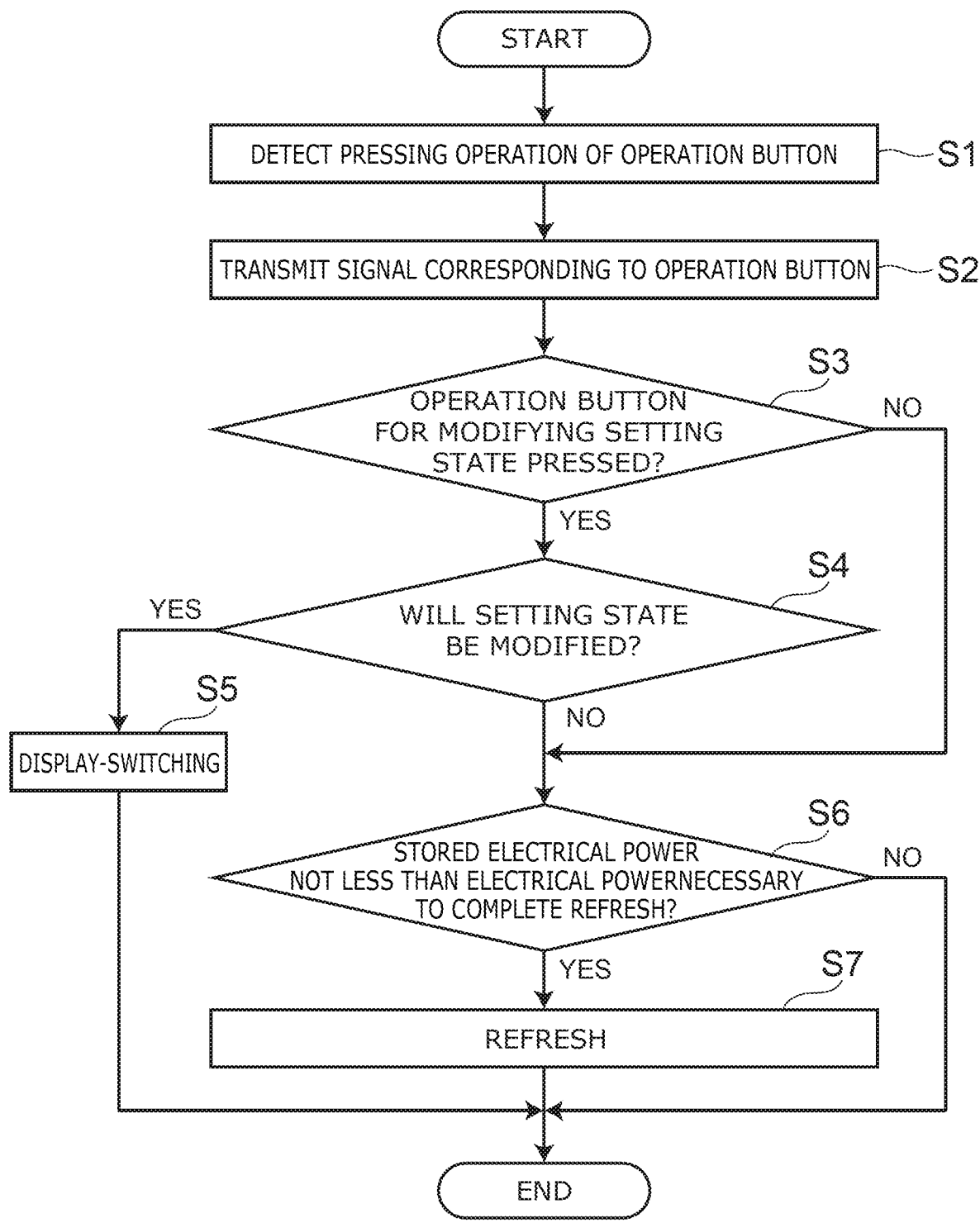
FIG. 8 is a flowchart illustrating an example of the favorable operation of the remote control device according to the embodiment.

FIG. 8 is a flowchart illustrating an example of the favorable operation of the remote control device according to the embodiment.

First, when the operation button 12 is pressed by the user, the detector 20 detects the pressing operation (step S1). Then, the controller 26 performs a signal transmission corresponding to the operation button 12 (step S2). Continuing, it is determined whether or not the operation button 12 is for modifying the setting state of the sanitary washing device 120 (step S3). In the case where the operation button 12 is not for modifying the setting state of the sanitary washing device 120, the flow proceeds to step S6.

In the case where the operation button 12 is for modifying the setting state of the sanitary washing device 120, the controller 26 determines whether or not the setting state of the sanitary washing device 120 actually will be modified by the pressing of the operation button 12 (step S4). In the case where the setting state of the sanitary washing device 120 is modified, the controller 26 performs the display-switching (step S5); and the processing ends. In the case where the setting state of the sanitary washing device 120 is not modified, the flow proceeds to step S6.

The first determination is performed in step S6. Namely, the controller 26 determines whether or not the electrical power stored in the electrical storage part 24 is in the first state and is larger than the electrical power necessary to complete the refresh. In the case where it is determined to be in the first state, the controller 26 performs the refresh (step S7). Or, as described above, another determination may be performed between step S6 and step S7; and as a result, the refresh of the electronic paper 16 may not be performed. In the case where it is determined not to be in the first state, or in the case where step S7 is performed, the processing ends.

As another embodiment, the controller 26 may perform the first determination when one of the multiple operation buttons 12 is pressed after the operation button 12 not modifying the setting state is pressed. The operation button 12 that is pressed the second time may be for modifying the setting state or may not be for modifying the setting state. According to the control method, the refresh can be performed at a more appropriate timing.

For example, the controller 26 performs the first determination when the operation button 12a, 12b, or 12c is pressed; and subsequently, the operation button 12d that stops the operation is pressed. In such a case, there is a tendency for the user not to view the remote control device 10 after pressing the stop operation button 12. Therefore, the refresh of the electronic paper 16 is performed easily in the state in which the user is not viewing the electronic paper 16. As a result, the likelihood of the user mistakenly thinking that the refresh is a misoperation or a malfunction of the electronic paper 16 can be reduced.

The case is described in the examples described above where the sanitary washing device 120 is remotely operated by the remote control device 10 according to the embodiment. The invention of the application is not limited to such an embodiment. The remote control device 10 according to the embodiment may be for remotely operating another wet-area device such as a hot water system, a bathroom dryer, etc.

The embodiments of the invention have been described above. However, the invention is not limited to the above description. Those skilled in the art can appropriately modify the design of the above embodiments. Such modifications are also encompassed within the scope of the invention as long as they include the features of the invention. For instance, the shape, dimension, material, layout, and placement of each element of the remote control device are not limited to those illustrated, but can be suitably modified.

Furthermore, the elements of the above embodiments can be combined with each other as long as technically feasible. Such combinations are also encompassed within the scope of the invention as long as they include the features of the invention.

What is claimed is:

1. A remote control device, comprising:
    an operation button for remotely operating a wet-area device;
    a generator generating electrical power by utilizing energy when the operation button is pressed;
    an electrical storage part storing the electrical power;
    electronic paper maintaining a display indicating a setting state of the wet-area device without utilizing the electrical power; and
    a controller controlling a refresh and a display-switching of the electronic paper by utilizing the electrical power stored in the electrical storage part, in the refresh, the controller causing to reverse a color of the display by the electronic paper, in the display-switching, the controller causing the electric paper to switch content of the display,
    when the operation button is pressed, the controller transmitting a signal for remotely operating the wet-area device by utilizing the electrical power stored in the electrical storage part,
    after transmitting the signal, the controller performing a first determination determining whether or not the electrical power stored in the electrical storage part is in a first state, the electrical power stored in the electrical storage part in the first state being larger than electrical power necessary to complete the refresh,
    the controller performing the refresh when the electrical power stored in the electrical storage part is in the first state and not performing the refresh when the electrical power stored in the electrical storage part is not in the first state.

2. The remote control device according to claim 1, wherein the operation button is not for modifying the setting state.

3. The remote control device according to claim 1, comprising a plurality of the operation buttons,
    a portion of the plurality of operation buttons not being for modifying the setting state,
    the controller performing the first determination when one of the plurality of operation buttons is pressed after the portion of the plurality of operation buttons is pressed.

4. The remote control device according to claim 1, wherein the wet-area device is a sanitary washing device including a nozzle discharging water toward a human private part.

5. A remote control device, comprising:
    an operation button for remotely operating a wet-area device;
    a generator generating electrical power by utilizing energy when the operation button is pressed;
    an electrical storage part storing the electrical power;
    electronic paper maintaining a display indicating a setting state of the wet-area device without utilizing the electrical power; and
    a controller controlling a refresh and a display-switching of the electronic paper by utilizing the electrical power stored in the electrical storage part, in the refresh, the controller causing to reverse a color of the display by the electronic paper, in the display-switching, the controller causing the electric paper to switch content of the display,
    when the operation button is pressed, the controller transmits a signal for remotely operating the wet-area device by utilizing the electrical power stored in the electrical storage part,
    when the operation button is pressed, the controller performs a second determination of determining whether or not the setting state will be modified,
    in the case where the setting state will not be modified, the controller performing a first determination determining whether or not the electrical power stored in the electrical storage part is in a first state, the electrical power stored in the electrical storage part in the first state being larger than electrical power necessary to complete the refresh,
    the controller performing the refresh when the electrical power stored in the electrical storage part is in the first state and not performing the refresh when the electrical power stored in the electrical storage part is not in the first state.

6. A remote control device, comprising:
    an operation button for remotely operating a wet-area device;
    a generator generating electrical power by utilizing energy when the operation button is pressed;
    an electrical storage part storing the electrical power;
    electronic paper maintaining a display indicating a setting state of the wet-area device without utilizing the electrical power; and
    a controller controlling a refresh and a display-switching of the electronic paper by utilizing the electrical power stored in the electrical storage part, in the refresh, the controller causing to reverse a color of the display by the electronic paper, in the display-switching, the controller causing the electric paper to switch content of the display, after transmitting the signal and the display-switching, the controller performing a first determination determining whether or not the electrical power stored in the electrical storage part is in a first state, the electrical power stored in the electrical storage part in the first state being larger than electrical power necessary to complete the refresh, the controller performing the refresh when the electrical power stored in the electrical storage part is in the first state and not performing the refresh when the electrical power stored in the electrical storage part is not in the first state.

* * * * *